(12) United States Patent
Miyakoshi

(10) Patent No.: US 9,103,399 B2
(45) Date of Patent: Aug. 11, 2015

(54) RETAINING STRUCTURE FOR INFORMATION RECORDING DEVICE AND IMAGE FORMING APPARATUS INCLUDING RETAINING STRUCTURE

(71) Applicant: KYOCERA Document Solutions Inc., Osaka (JP)

(72) Inventor: Naoto Miyakoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/185,643

(22) Filed: Feb. 20, 2014

(65) Prior Publication Data

US 2014/0239145 A1    Aug. 28, 2014

(30) Foreign Application Priority Data

Feb. 22, 2013  (JP) ................................. 2013-032890

(51) Int. Cl.
*G06F 1/16* (2006.01)
*H05K 5/00* (2006.01)
*H05K 7/00* (2006.01)
*F16F 1/373* (2006.01)
*G03G 21/16* (2006.01)

(52) U.S. Cl.
CPC .......... *F16F 1/3732* (2013.01); *G03G 21/1619* (2013.01)

(58) Field of Classification Search
CPC ...................................................... G11B 33/08
USPC ............ 248/686, 548, 614, 634, 636, 220.21, 248/220.22, 222.13, 223.41, 224.51, 248/225.11; 361/679.37–349.39, 361/679.33–679.36
See application file for complete search history.

(56) References Cited

U.S. PATENT DOCUMENTS

| | | | | |
|---|---|---|---|---|
| 5,654,873 A | * | 8/1997 | Smithson et al. | 361/679.37 |
| 6,421,236 B1 | * | 7/2002 | Montoya et al. | 361/679.58 |
| 6,499,714 B1 | * | 12/2002 | Wike | 248/632 |
| 7,068,502 B2 | * | 6/2006 | Chen et al. | 361/679.39 |
| 7,221,565 B2 | * | 5/2007 | Ko | 361/679.34 |
| 7,656,658 B2 | * | 2/2010 | Liu et al. | 361/679.37 |
| 7,954,784 B2 | * | 6/2011 | Yeh et al. | 248/635 |
| 7,995,337 B2 | * | 8/2011 | Kuo | 361/679.34 |
| 8,544,801 B2 | * | 10/2013 | Ting | 248/27.3 |

(Continued)

FOREIGN PATENT DOCUMENTS

JP          2004-019695 A       1/2004

*Primary Examiner* — Terrell McKinnon
*Assistant Examiner* — Michael McDuffie
(74) *Attorney, Agent, or Firm* — Knobbe, Martens, Olson & Bear LLP

(57) ABSTRACT

A HDD retaining mechanism includes a frame and a vibration isolator. The frame includes a through hole in a prescribed position. The vibration isolator includes a smaller cylindrical portion formed so as to be fitted in the through hole. The smaller cylindrical portion includes projecting portions formed by splitting one end portion of the smaller cylindrical portion into a plurality of portions in a circumferential direction. The projecting portions project into the accommodation space and abut against a HDD when the smaller cylindrical portion is fitted in the through hole. Each of the projecting portions includes a notch part recessed toward a center position of the smaller cylindrical portion from an outer circumferential surface of the cylindrical portion and extending across each of the projecting portions in the smaller circumferential direction of the cylindrical portion.

8 Claims, 13 Drawing Sheets

(56) References Cited

U.S. PATENT DOCUMENTS

| | | | |
|---|---|---|---|
| 8,584,999 B2* | 11/2013 | Liu et al. | 248/222.12 |
| 8,593,803 B2* | 11/2013 | Guo et al. | 361/679.39 |
| 8,654,521 B2* | 2/2014 | Liang | 361/679.33 |
| 8,817,460 B2* | 8/2014 | Yu et al. | 361/679.33 |
| 2005/0141189 A1* | 6/2005 | Chen et al. | 361/685 |
| 2007/0008696 A1* | 1/2007 | Masuda | 361/685 |
| 2008/0259554 A1* | 10/2008 | Qin et al. | 361/685 |
| 2012/0104222 A1* | 5/2012 | Ding | 248/634 |
| 2013/0033814 A1* | 2/2013 | Huang | 361/679.37 |

* cited by examiner

RETAINING STRUCTURE FOR INFORMATION RECORDING DEVICE AND IMAGE FORMING APPARATUS INCLUDING RETAINING STRUCTURE

INCORPORATION BY REFERENCE

This application claims priority to Japanese Patent Application No. 2013-032890 filed on 22 Feb. 2013, the entire contents of which are incorporated by reference herein.

BACKGROUND

1. Technical Field

The present disclosure relates to a retaining structure for an information recording device such as a hard disk drive, and to an image forming apparatus that includes the retaining structure.

2. Related Art

Image forming apparatuses that include a hard disk drive (hereinafter, HDD) serving as an information recording device are widely known. The HDD is installed in the image forming apparatus, for example, via a retainer that can be removably mounted in the image forming apparatus, for facilitating the installation and removal of the HDD in and from the image forming apparatus.

In case that the HDD is subjected to vibration or the like the magnetic disk and the magnetic head may be made to contact each other, and either or both of the magnetic disk and the magnetic head may be damaged. Accordingly, a retaining structure that protects and retains the HDD has to be provided when the HDD is installed in the image forming apparatus. Some of such retaining structures thus far developed include a vibration isolator, for example attached to a housing in which the HDD is accommodated, for mitigating vibration applied to the HDD.

SUMMARY

In an aspect, the disclosure proposes further improvement of the foregoing technique.

The disclosure provides a retaining structure for information recording device, including a frame and a vibration isolator.

The frame forms an accommodation space in which the information recording device to be retained is accommodated.

The vibration isolator is mounted on the frame and abutting against the information recording device accommodated in the accommodation space.

The frame includes a through hole in a prescribed position.

The vibration isolator includes a cylindrical portion formed so as to be fitted in the through hole.

The cylindrical portion includes projecting portions formed by splitting one end portion of cylindrical portion into a plurality of portions in a circumferential direction.

The projecting portions project into the accommodation space and abut against the information recording device when the cylindrical portion is fitted in the through hole.

Each of the projecting portions includes a notch part recessed toward a center position of the cylindrical portion from an outer circumferential surface of the cylindrical portion and extending across each of the projecting portions in the circumferential direction of the cylindrical portion.

In another aspect, the disclosure provides an image forming apparatus including an information recording device and the foregoing retaining structure that retains the information recording device.

DETAILED DESCRIPTION

Hereafter, an exemplary embodiment of an image forming apparatus that includes a retaining structure for information recording device according to the disclosure will be described.

Figure 1:
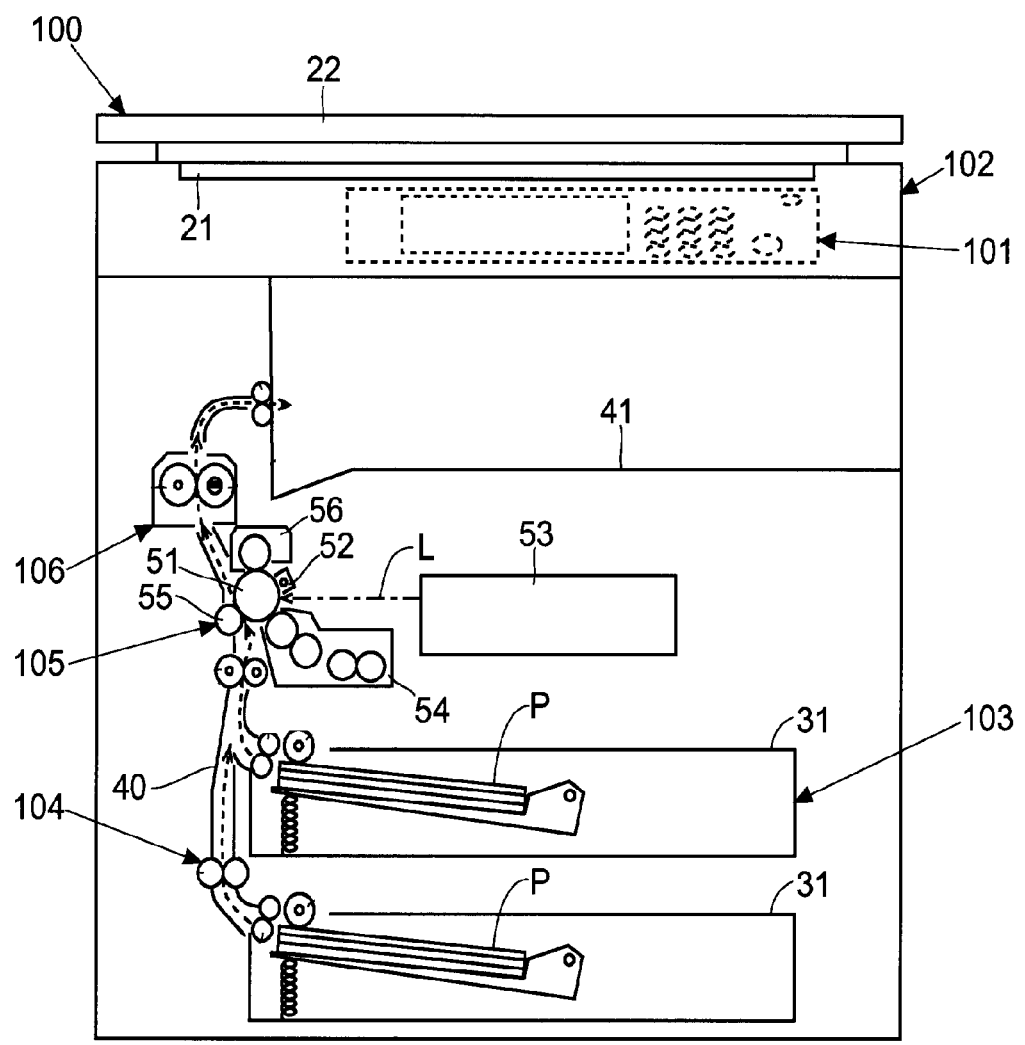
FIG. 1 is a schematic cross-sectional view showing an image forming apparatus that includes a retaining structure for information recording device according to an embodiment of the disclosure.

As shown in FIG. 1, an image forming apparatus 100 according to this embodiment is a monochrome multifunction peripheral, and includes an operation panel 101, an image reading unit 102, a paper feed unit 103, a paper transport unit 104, an image forming unit 105, and a fixing unit 106.

The operation panel 101 includes an LCD panel with a touch panel, and displays a screen in which soft keys for inputting changes of settings for printing and so forth are arranged.

The image reading unit 102 reads (scans) a source document and generates image data.

The paper feed unit 103 includes a sheet cassette 31 in which paper sheets P are placed, and delivers the paper sheet P in the sheet cassette 31 to a sheet transport route 40.

The paper transport unit 104 serves to transport the paper sheet P introduced to the transport route 40 along the transport route 40, and to guide the paper sheet P to an output tray 41 through the image forming unit 105 and the fixing unit 106.

The image forming unit 105 forms a toner image based on the image data, and transfers the toner image onto the paper sheet P. The image forming unit 105 includes a photoconductor drum 51, a charging unit 52, an exposure unit 53, a developing unit 54, a transfer roller 55 and a cleaning unit 56.

The fixing unit 106 heats with pressure the toner image paper transferred onto the paper sheet P, thereby fixing the toner image on the paper sheet P.

Figure 2:
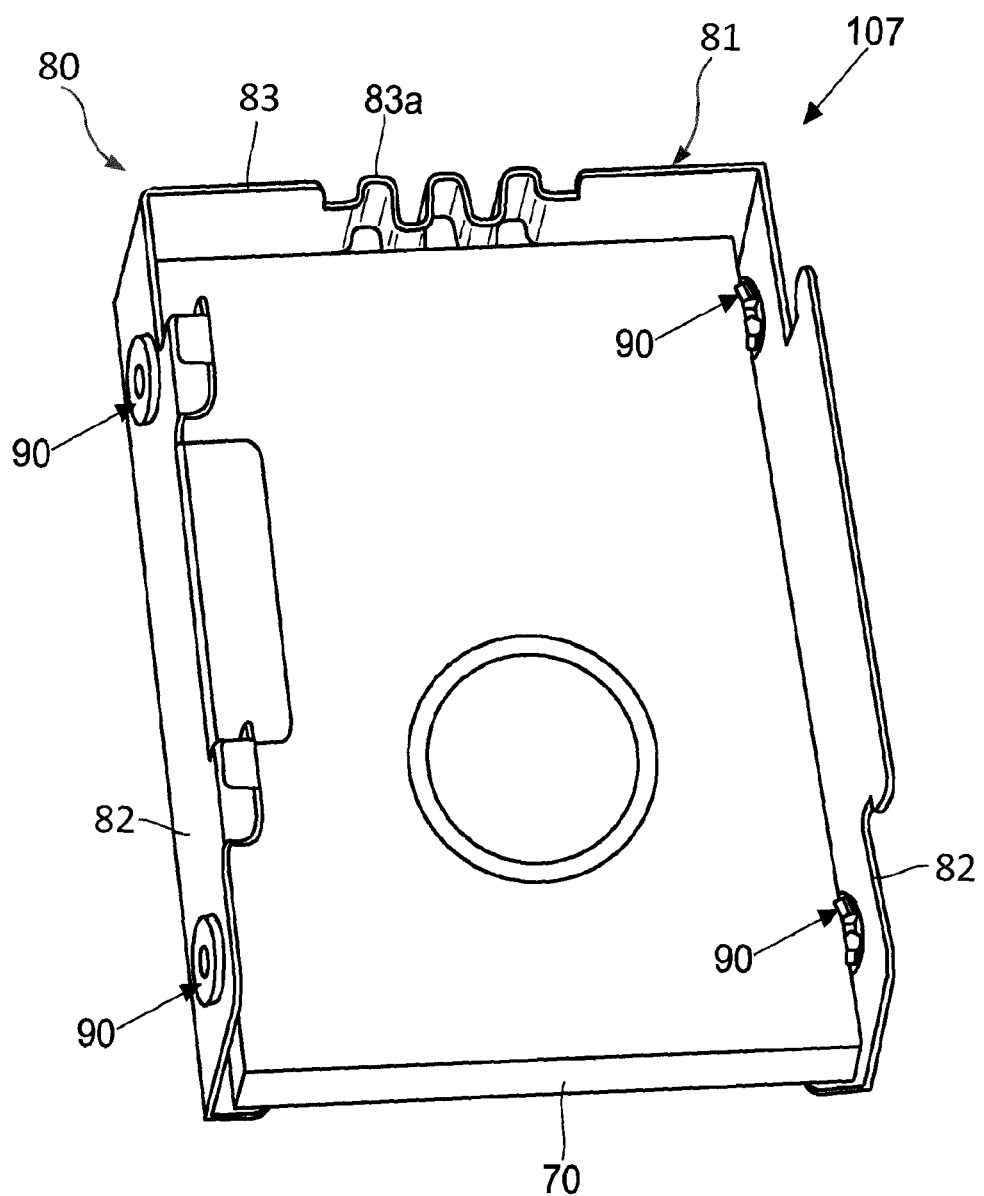
FIG. 2 is a perspective view showing the retaining structure for information recording device according to the embodiment of the disclosure, with an information recording device mounted thereon.

Now, an HDD 70 as shown in FIG. 2 is installed in the image forming apparatus 100, and various kinds of data such as the image data is stored in the HDD 70. The location for installing the HDD 70 is not specifically limited, and the HDD 70 may be installed at any position in the image forming apparatus 100. Here, the HDD 70 corresponds to the information recording device in the disclosure.

The HDD 70 includes a magnetic disk, a magnetic head, and so forth. Reading and writing of data is performed by rotating the magnetic disk at a high speed and bringing the magnetic head close to the magnetic disk. In case that the HDD 70 thus configured is subjected to an external force (impact, vibration, and so on), the magnetic disk and the magnetic head may be made to contact each other and either or both of the magnetic disk and the magnetic head may be damaged.

Figure 3:
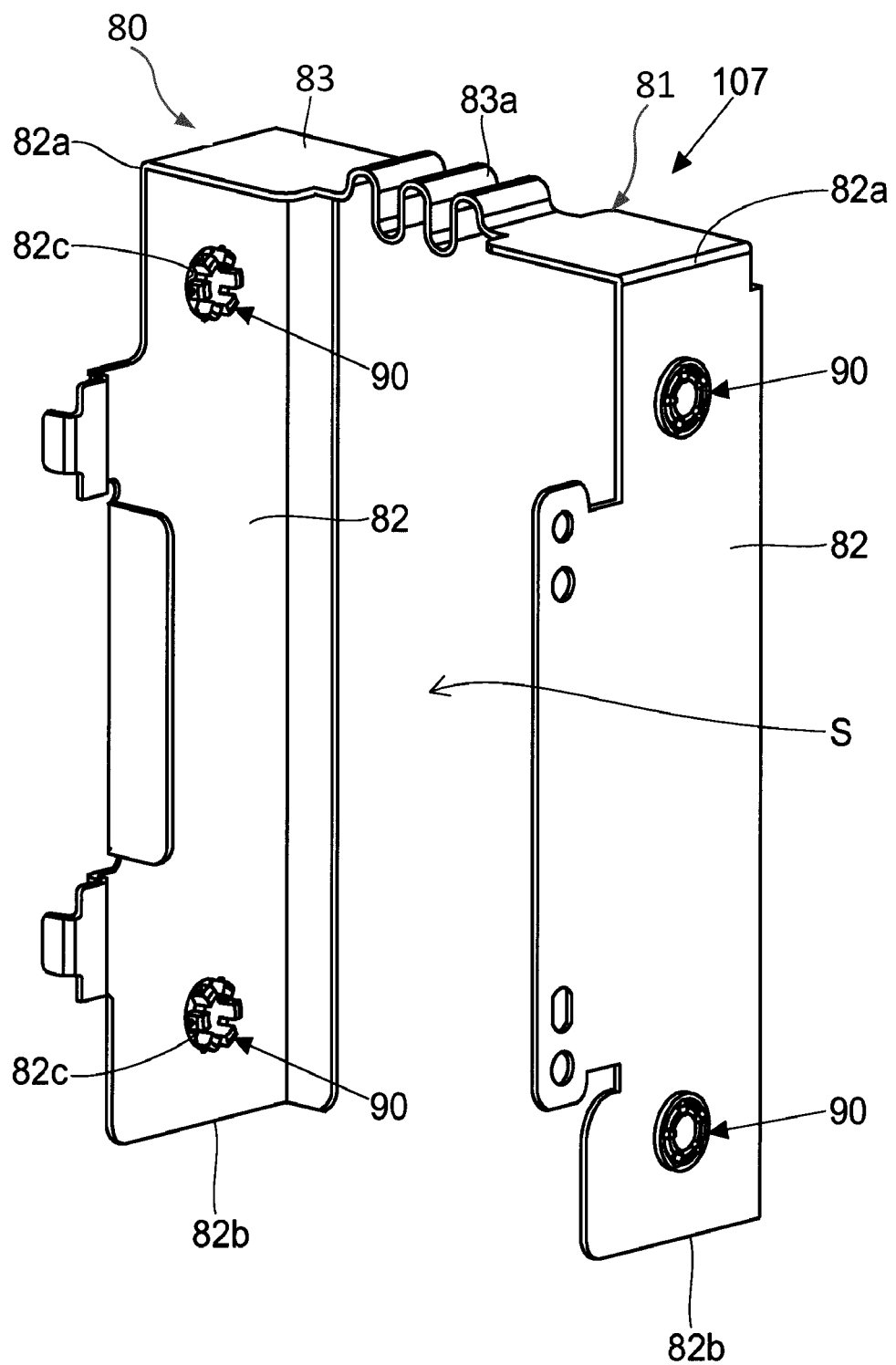
FIG. 3 is a perspective view showing a configuration of the retaining structure for information recording device according to the embodiment of the disclosure.

Accordingly, the HDD 70 (see FIG. 2) is retained by an HDD retainer unit 107 shown in FIG. 3, thus to be protected from impact or vibration. Here, the HDD retainer unit 107 corresponds to the retaining structure for information recording device in the disclosure. The HDD retainer unit 107 includes a retainer 80 formed by bending a metal plate, and a vibration isolator 90 formed of an elastic material such as rubber.

Figure 4:
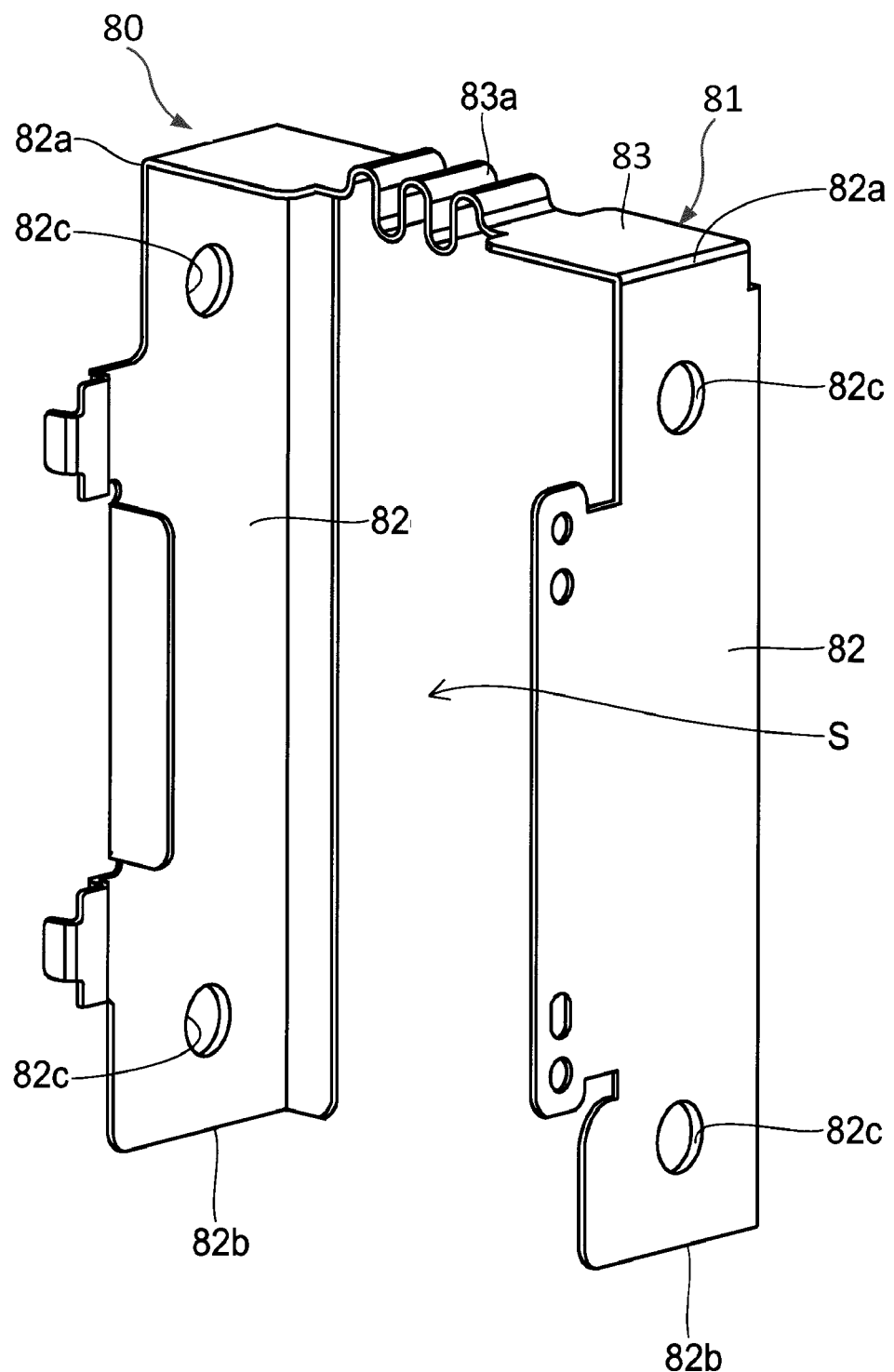
FIG. 4 is a perspective view showing a retainer included in the retaining structure shown in FIG. 3.

The retainer 80 includes, as shown in FIG. 4, a frame 81 formed so as to form an accommodation space S in which the HDD 70 to be retained is placed. The frame 81 includes a pair of first frame portions 82 opposite to each other through the accommodation space S, and a second frame portion 83 connecting between one of the end portions 82a of the respective first frame portions 82. The other end portions 82b of the respective first frame portions 82 are unconnected. In other words, the frame 81 is bent substantially in a U-shape, so as to surround the accommodation space S from three directions.

The pair of first frame portions 82 each include a mounting orifice 82c for attaching the vibration isolator 90 (see FIG. 3). The mounting orifice 82c has a circular opening, and is formed to penetrate the first frame portion 82 in the plate-thickness direction thereof. Here, the mounting orifice 82c corresponds to the through hole in the disclosure.

The pair of first frame portions 82 each include two mounting orifice 82c (one each close to the end portion 82a and the other end portion 82b). The vibration isolator 90 is attached to all the four mounting orifices 82c, as shown in FIG. 3. Here, the number of mounting orifices 82c formed on each of the first frame portions 82 may be just one, or three or more.

The second frame portion 83 is without a mounting orifice for attaching the vibration isolator 90, but includes a corrugated portion 83a formed by bending a part (generally central portion) of the second frame portion 83 in a wave shape. To be more detailed, a part of the second frame portion 83 is bent such that portions protruding away from the accommodation space S and portions protruding into the accommodation space S repeatedly alternate. Accordingly, a part of the second frame portion 83 (corrugated portion 83a) is formed in a wave shape. Forming thus the corrugated portion 83a of a wave shape in a part of the second frame portion 83 makes that part of the second frame portion 83 more easily elastically deformable than the remaining portions of the frame 81. Thus, an elastically deformable portion (corrugated portion 83a), which can be more easily elastically deformed than the remaining portions of the frame 81, is intentionally formed in a part of the second frame portion 83.

With such a configuration, when the first frame portions 82 are subjected to a force exerted in a direction to move away from each other, the corrugated portion 83a of the second frame portion 83 is deformed so that the clearance between the first frame portions 82 becomes wider. Then when the first frame portions 82 are released from the force thus far exerted, the corrugated portion 83a of the second frame portion 83 is restored and the clearance between the first frame portions 82 returns to the initial state.

Figure 5:
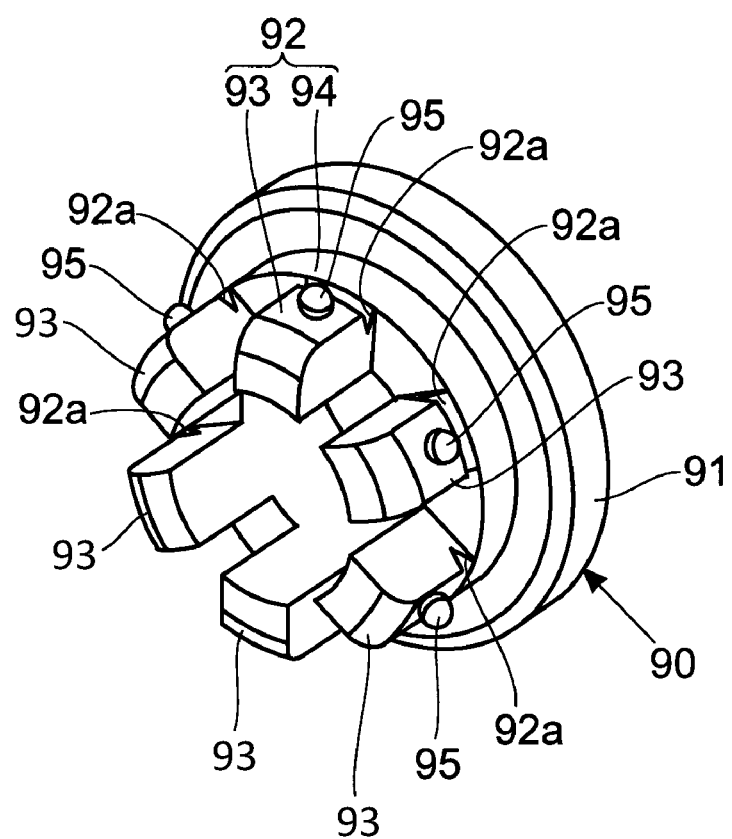
FIG. 5 is a perspective view showing a vibration isolator included in the retaining structure shown in FIG. 3.
Figure 6:
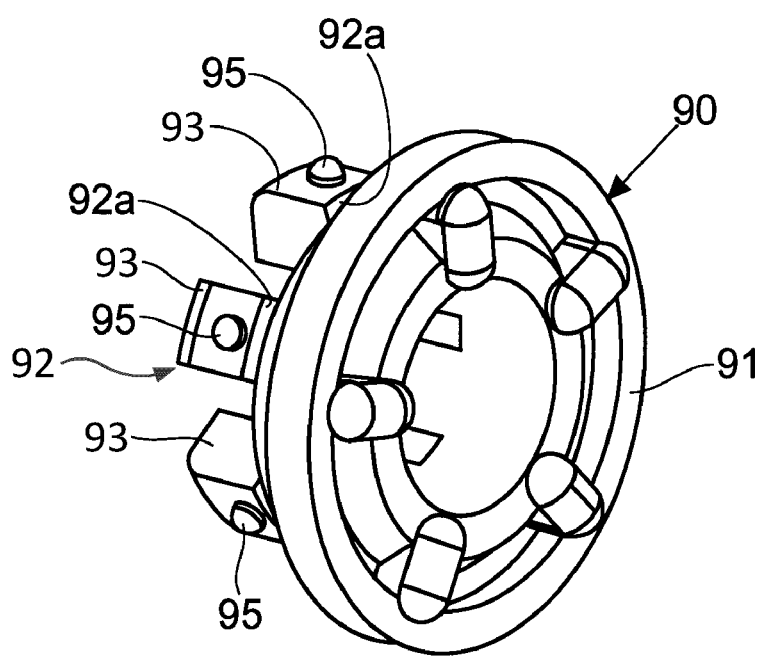
FIG. 6 is another perspective view showing the vibration isolator included in the retaining structure shown in FIG. 3.

As shown in FIGS. 5 and 6, the vibration isolator 90 is substantially formed in a cylindrical shape, and includes a portion 91 having an outer diameter larger than that of the remaining portions and a portion 92 having an outer diameter smaller than that of the portion 91. In the description given below, the portion 91 will be referred to as larger cylindrical portion 91, and the portion 92 will be referred to as smaller cylindrical portion 92. Here, the smaller cylindrical portion 92 corresponds to the cylindrical portion in the disclosure.

The larger cylindrical portion 91 has an outer diameter larger than an aperture size of the mounting orifice 82c (see FIG. 4). In contrast, the smaller cylindrical portion 92 has an outer diameter equal to or slightly smaller than the aperture size of the mounting orifice 82c. In other words, the smaller cylindrical portion 92 can be fitted in the mounting orifice 82c.

Figure 7:
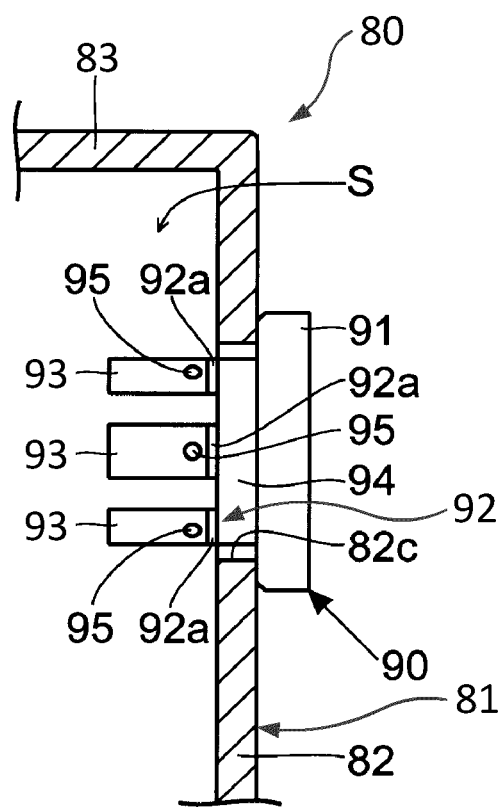
FIG. 7 is a side view of the vibration isolator included in the retaining structure shown in FIG. 3.

The vibration isolator 90 is attached to the mounting orifice 82c upon fitting (inserting) the smaller cylindrical portion 92 in the mounting orifice 82c, as shown in FIG. 7. When the smaller cylindrical portion 92 is fitted in the mounting orifice 82c, the larger cylindrical portion 91 is located on the opposite side of the accommodation space S. Therefore, the vibration isolator 90 is kept from falling off into the accommodation space S. Here, although the outer diameter of the smaller cylindrical portion 92 is smaller than the aperture size of the mounting orifice 82c in FIG. 7 for the sake of visual clarity, the outer diameter of the smaller cylindrical portion 92 may be the same as the aperture size of the mounting orifice 82c.

In addition, when the smaller cylindrical portion 92 is fitted in the mounting orifice 82c (when the vibration isolator 90 is attached to the mounting orifice 82c), one end portion of the smaller cylindrical portion 92 sticks out into the accommodation space S. Hereafter, the portion of the smaller cylindrical portion 92 sticking out into the accommodation space S will be referred to as projecting portions 93, and the portion fitted in the mounting orifice 82c will be referred to as base portion 94.

Since the projecting portions 93 stick out into the accommodation space S, the HDD 70 (see FIG. 2) placed in the accommodation space S is made to abut the projecting portions 93, but not the retainer 80. Therefore, an external force (impact, vibration, and so on) applied to the HDD 70 can be absorbed by the vibration isolator 90.

Figure 8:
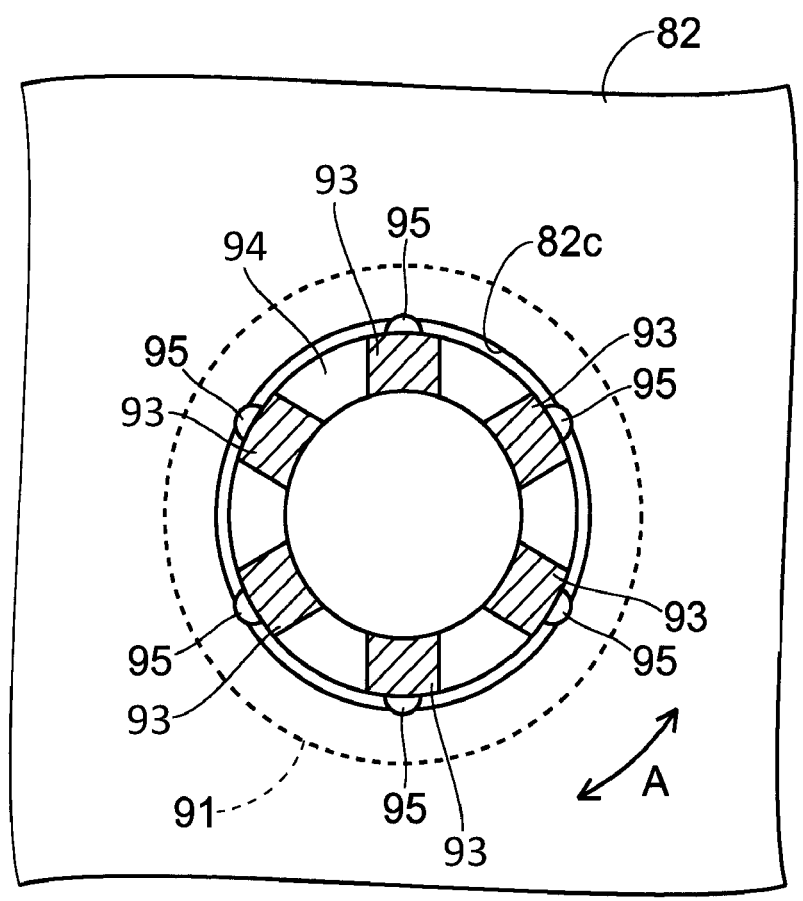
FIG. 8 is a rear view of the vibration isolator included in the retaining structure shown in FIG. 3.

Now, as shown in FIGS. 7 and 8, the projecting portions 93 are formed by splitting one end portion of the smaller cylindrical portion 92 into a plurality of portions at predetermined intervals (regular intervals) in the circumferential direction of the smaller cylindrical portion 92 (direction A in FIG. 8). In other words, one end portion of the smaller cylindrical portion 92 includes a plurality of slits extending from the distal end portion to the base portion 94 and formed at predetermined intervals in the circumferential direction of the smaller cylindrical portion 92, the slits defining the projecting portions 93. In this embodiment, one end portion of the smaller cylindrical portion 92 is split into six portions. However, one end portion of the smaller cylindrical portion 92 may be split into any number of portions not smaller than two. In FIG. 8, the outer diameter of the smaller cylindrical portion 92 is smaller than the aperture size of the mounting orifice 82c and each of the projecting portions 93 are hatched, for the sake of visual clarity.

Figure 9:
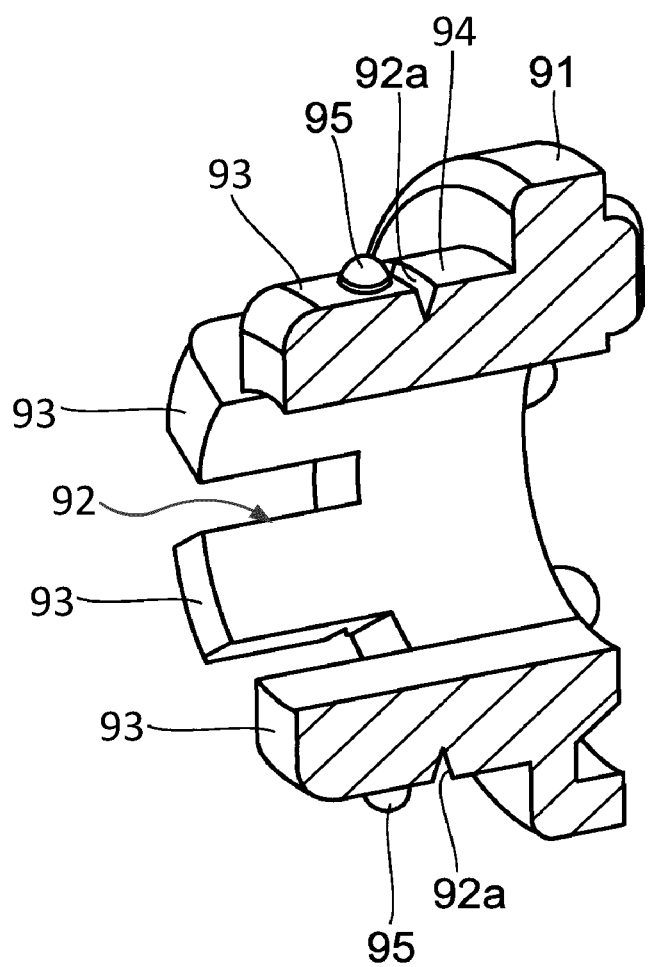
FIG. 9 is a perspective cross-sectional view showing the vibration isolator included in the retaining structure shown in FIG. 3.

In addition, as shown in FIGS. 7 and 9, each of the projecting portions 93 includes a notch part 92a recessed from the outer circumferential surface of the smaller cylindrical portion 92, and extending all the way across each of the projecting portions 93 in the circumferential direction. The notch part 92a is formed substantially along the boundary between the projecting portions 93 and the base portion 94. In addition, the notch part 92a has a wedge-shaped cross section that becomes narrower toward a center position of the smaller cylindrical portion 92 from the outer circumferential surface of the smaller cylindrical portion 92. The depth of the notch part 92a is, for example, shallower than a half of the wall thickness of the smaller cylindrical portion 92.

Figure 10:
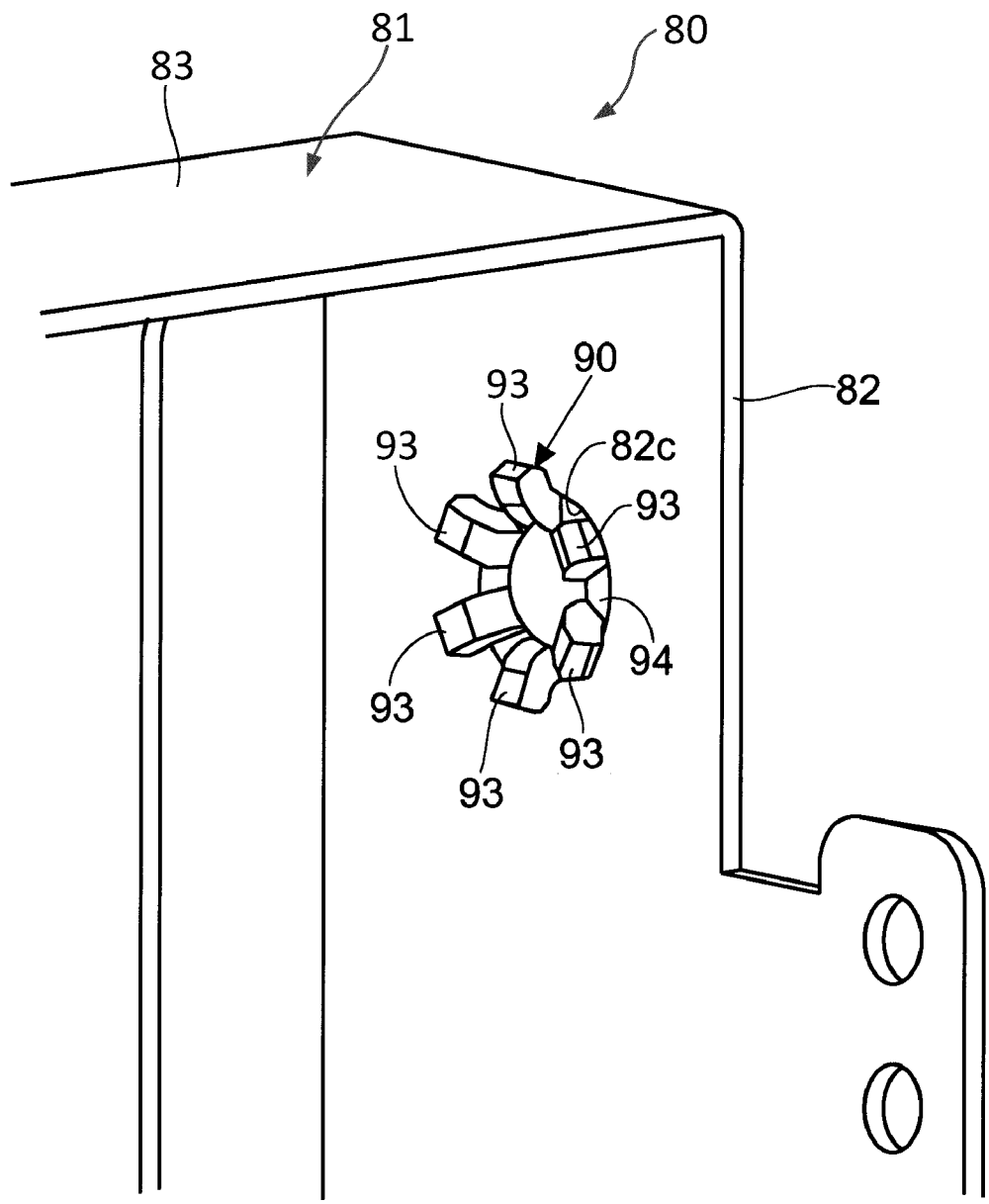
FIG. 10 is a perspective view showing the vibration isolator included in the retaining structure shown in FIG. 3, pressed from the side of accommodation space so that a portion of each of cylindrical portions of the vibration isolator is radially spread.

With one end portion of the smaller cylindrical portion 92 split into a plurality of the projecting portions 93 and the notch part 92a formed on each of the projecting portions 93, one end portion of the smaller cylindrical portion 92, more specifically each of the projecting portions 93 is spread radially outward about the notch part 92a serving as the fulcrum as shown in FIG. 10, when the projecting portions 93 are pressed from the side of the distal end portion thereof toward the base portion 94. Then each of the projecting portions 93 protrudes to an outer region of the mounting orifice 82c over the peripheral edge thereof. Accordingly, when the projecting portions 93 are pressed from the side of the distal end portion thereof toward the base portion 94 so that each of the projecting portions 93 is spread radially outward, the vibration isolator 90 is restricted from moving in the direction opposite to the accommodation space S, and thus prevented from falling off on the opposite side of the accommodation space S.

Further, as shown in FIGS. 5 to 9, the smaller cylindrical portion 92 includes a plurality of semispherical convex parts 95 formed on the outer circumferential surface. Each of the convex parts 95 is independently formed on the outer circumferential surface of one of the projecting portions 93, and not an annular projection continuously aligned in the circumferential direction of the smaller cylindrical portion 92. The convex part 95 is located on the side of the distal end portion of the projecting portions 93, which is made to abut the HDD 70, with respect to the notch part 92a.

The convex parts 95 each project radially outward from the peripheral edge of the mounting orifice 82c, when viewed in the axial direction of the smaller cylindrical portion 92 as shown in FIG. 8, when the projecting portions 93 are free from an external force (free from a pressure from the side of the distal end portion thereof toward the base portion 94), i.e., when the projecting portions 93 are fitted in the mounting orifice 82c. Accordingly, the convex parts 95 serve to restrict the vibration isolator 90 from moving in the direction opposite to the accommodation space S because of interference with the peripheral edge of the mounting orifice 82c, even when the projecting portions 93 remain unspread because of the projecting portions 93 being free from an external force, i.e., free from a pressure from the side of the distal end portion thereof toward the base portion 94. Therefore, the vibration isolator 90 can be prevented from falling off on the opposite side of the accommodation space S.

Figure 11:
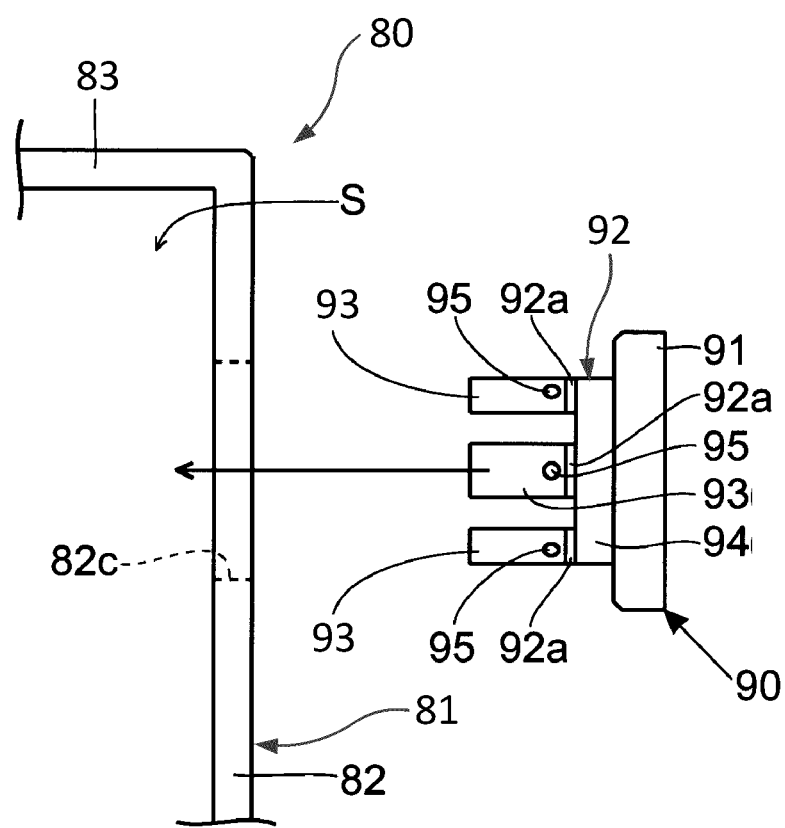
FIG. 11 is a side view for explaining a process for attaching the vibration isolator included in the retaining structure shown in FIG. 3.

To attach the vibration isolator 90 configured as above to the retainer 80, the smaller cylindrical portion 92 is inserted into the mounting orifice 82c from the opposite side of the accommodation space S, as shown in FIG. 11. At this point, the convex parts 95 interfere with the peripheral edge of the mounting orifice 82c. However, when the convex parts 95 are pressed inwardly of the mounting orifice 82c, each of the projecting portions 93 is elastically deformed so as to tilt inwardly of the mounting orifice 82c. Accordingly, upon further inserting the smaller cylindrical portion 92 into the mounting orifice 82c, the projecting portions 93 can be introduced into the accommodation space S. Here, the projecting portions 93 are not yet radially spread when the smaller cylindrical portion 92 is being inserted into the mounting orifice 82c. Therefore, the smaller cylindrical portion 92 can be inserted into the mounting orifice 82c without the need to apply a large force to the vibration isolator 90 and to largely deform the smaller cylindrical portion 92, for inserting the smaller cylindrical portion 92 into the mounting orifice 82c. Then the entirety of the smaller cylindrical portion 92 including the base portion 94 is inserted into the mounting orifice 82c, thereby fitting the base portion 94 in the mounting orifice 82c. Thus, the vibration isolator 90 can be attached as shown in FIG. 3.

Figure 12:
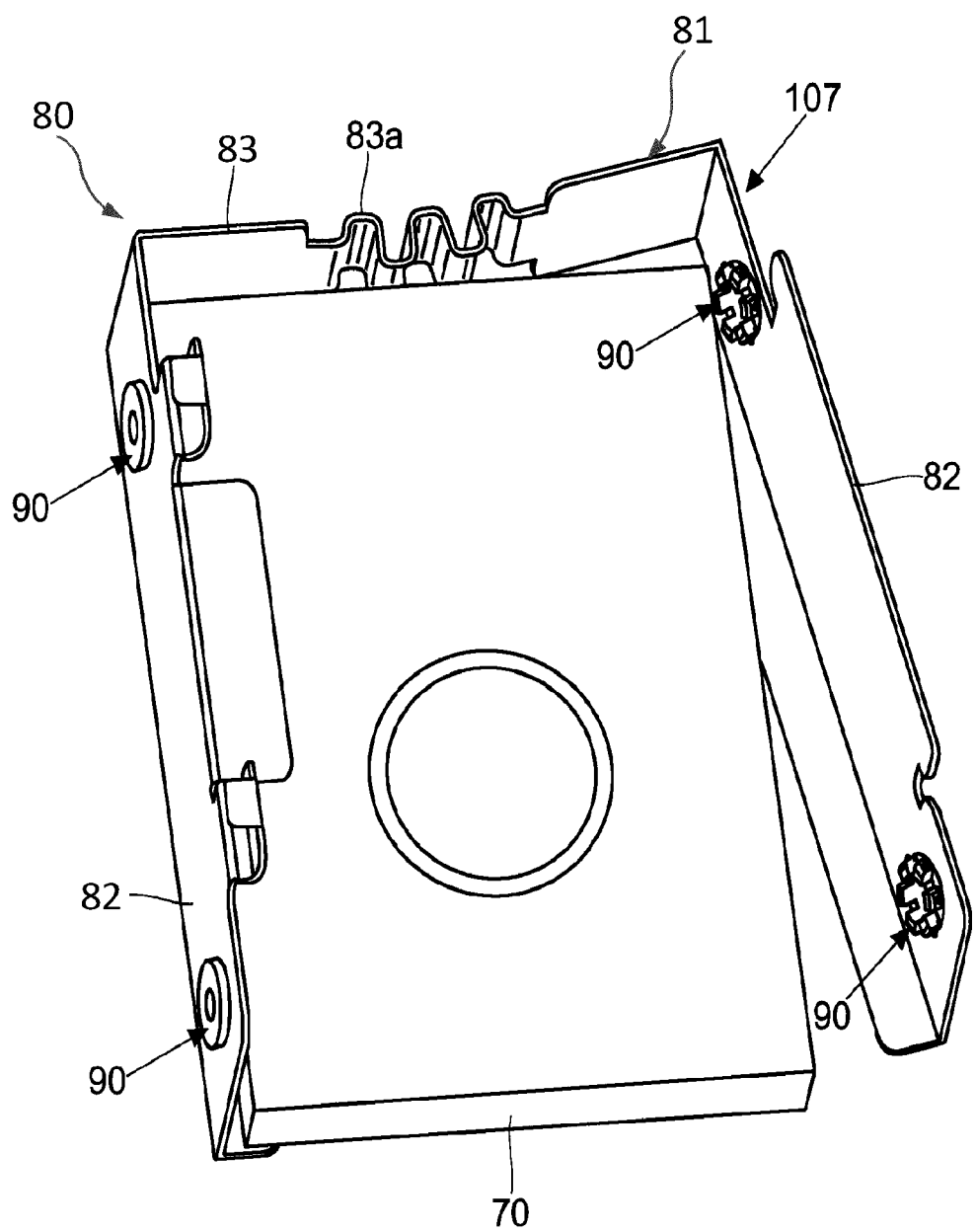
FIG. 12 is a perspective view for explaining a process for setting an information recording device on the retaining structure shown in FIG. 3.
Figure 13:
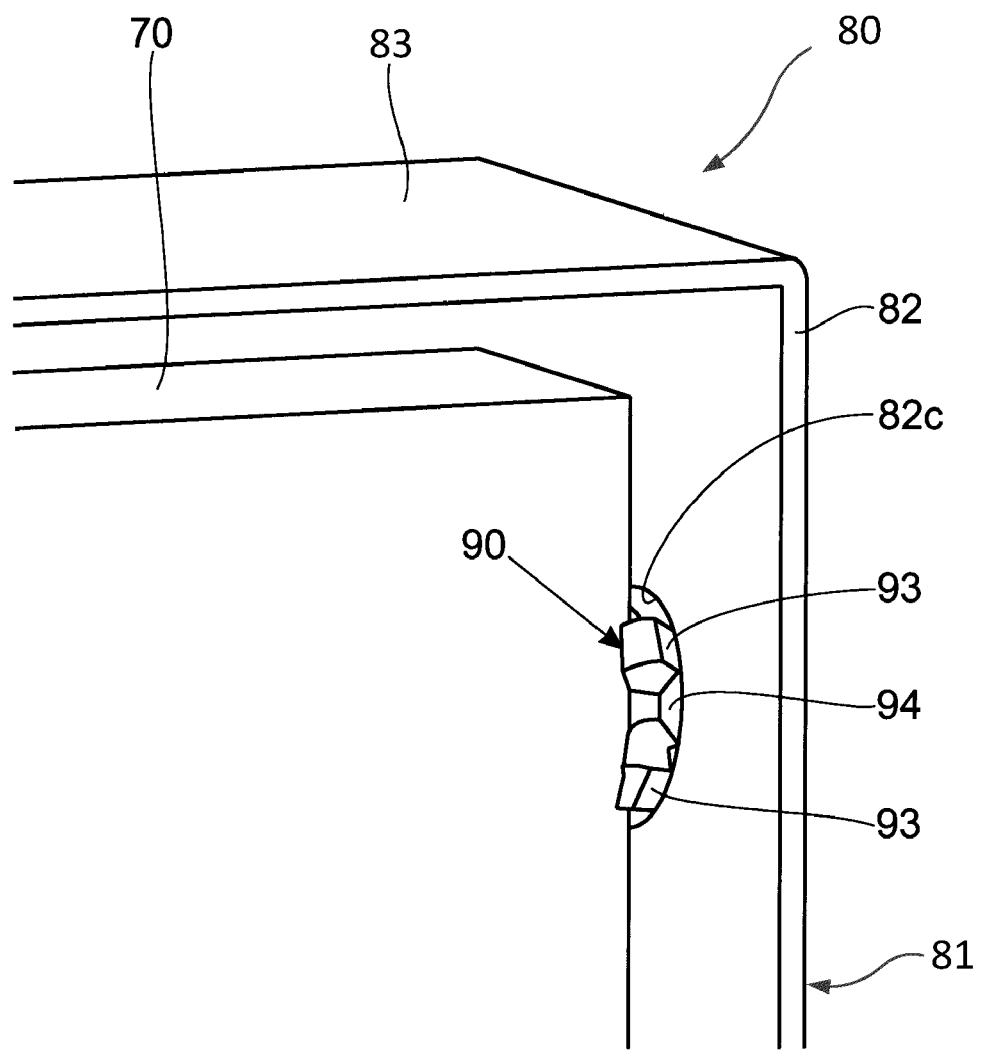
FIG. 13 is a fragmentary perspective view showing the vibration isolator engaged with the information recording device retained by the retaining structure shown in FIG. 3.

To place the HDD 70 in the retainer 80 to which the vibration isolators 90 are attached, the clearance between the pair of first frame portions 82 is spread by elastically deforming the corrugated portion 83a of the second frame portion 83, as shown in FIG. 12. Then the HDD 70 is placed in the accommodation space S and the first frame portions 82 are set to the initial position, so that the shape of the corrugated portion 83a is restored. Thus, the HDD 70 can be set as shown in FIG. 2. At this point, the vibration isolator 90 is pressed from the side of the accommodation space S. In other words, the projecting portions 93 are pressed from the side of the distal end portion thereof toward the base portion 94. Accordingly, each of the projecting portions 93 is radially spread as shown in FIG. 13.

Then non-illustrated screws are inserted in the cavity of the larger cylindrical portion 91 and the smaller cylindrical portion 92 of the vibration isolator 90, and the HDD 70 is fastened to the frame 81 with those screws. Thus, the HDD 70 is immovably fixed in the accommodation space S.

In some of conventional retaining structures, the vibration isolator has a cylindrical shape and a pair of convex parts are formed around the outer circumferential surface of the vibration isolator. The housing to which the vibration isolator is attached includes an opening in which the portion of the vibration isolator between such circumferential projections is to be fitted. To attach the vibration isolator to the housing, one of the pair of circumferential projections is pressed against the peripheral edge of the opening of the housing, so as to be inserted into the housing through the opening by being deformed. Thus, the portion of the vibration isolator between the pair of circumferential projections is fitted in the opening of the housing. In other words, the peripheral edge of the opening of the housing is caught between the pair of circumferential projections of the vibration isolator. As a result, the vibration isolator is attached to the housing.

In contrast, the HDD retainer unit 107 (retaining structure for information recording device) according to this embodiment includes, as described above, the retainer 80 including the frame 81 formed so as to surround the accommodation space S in which the HDD 70 (information recording device) to be retained is accommodated, the frame 81 including the mounting orifice 82c (through hole), and the vibration isolator 90 including the smaller cylindrical portion 92 (cylindrical portion) that can be fitted in the mounting orifice 82c such that a part of the smaller cylindrical portion 92 sticks out into the accommodation space S, and the projecting portions 93 which are one end portion of the smaller cylindrical portion 92 projecting into the accommodation space S so as to abut against the HDD 70. The projecting portions 93 are formed by splitting one end portion of the smaller cylindrical portion 92 into the plurality of portions in the circumferential direction. Further, each of the projecting portions 93 includes the notch part 92a recessed from the side of the outer circumferential surface of the smaller cylindrical portion 92 and extending in the circumferential direction thereof.

With such a configuration, when the HDD 70 is placed in the accommodation space S one end portion of the smaller cylindrical portion 92 is bent so as to radially spread, more specifically each of the projecting portions 93 is radially spread about the notch 92a serving as the fulcrum, because the HDD 70 is made to abut the part of the smaller cylindrical portion 92 and hence the smaller cylindrical portion 92 is pressed from the side of the accommodation space S. Therefore, one end portion of the smaller cylindrical portion 92 sticking out into the accommodation space S can be engaged with the peripheral edge of the mounting orifice 82c. In other words, the vibration isolator 90 is restricted from moving in the axial direction (penetrating direction of the mounting orifice 82c which is a through hole), and therefore the vibration isolator 90 is prevented from falling off.

The mentioned configuration eliminates the need to form in advance a portion projecting radially of the smaller cylindrical portion 92, for instance an annular flange portion to be engaged with the peripheral edge of the mounting orifice 82c, on one end portion of the smaller cylindrical portion 92 sticking out into the accommodation space S, i.e., on the projecting portion 93. Therefore, the smaller cylindrical portion 92 can be fitted in the mounting orifice 82c without the need to largely deform the vibration isolator 90, in other words without the need to exert a large force on the vibration isolator 90. Since the smaller cylindrical portion 92 can be fitted in the mounting orifice 82c without largely deforming the smaller cylindrical portion 92, the vibration isolator 90 can be prevented from being damaged. In addition, since the smaller cylindrical portion 92 can be fitted in the mounting orifice 82c without deforming the smaller cylindrical portion 92, the work efficiency for attaching the vibration isolator 90 can be improved.

The conventional retaining structures for an information recording device such as the HDD generally include a vibration isolator such as the one described above, for mitigating vibration applied to the HDD. However, with the conventional vibration isolator described earlier, a part of the vibration isolator (one of the pair of circumferential projections) has to be deformed when the vibration isolator is attached to the housing. Accordingly, the vibration isolator may be damaged while being attached to the housing, for example the base portion of the circumferential projection may be cracked. In addition, it takes a longer time for attaching the vibration isolator, which leads to degraded work efficiency.

In contrast, with the HDD retainer unit 107 according to this embodiment, the vibration isolator can be prevented from being damaged, and the work efficiency for attaching the vibration isolator can be improved.

In this embodiment, further, the notch part 92a formed on the projecting portion 93 has a wedge-shaped cross section that becomes narrower toward a center position of the smaller cylindrical portion 92 from the side of the outer circumferential surface of the smaller cylindrical portion 92. Such a configuration assures that one end portion of the smaller cylindrical portion 92, i.e., each of the projecting portions 93, is radially spread when the smaller cylindrical portion 92 is pressed from the side of the accommodation space S.

In this embodiment, further, the frame 81 of the retainer 80 includes the pair of first frame portions 82 opposite to each other through the accommodation space S and the second frame portion 83 connecting between one of the end portions 82a of the respective first frame portions 82. The frame 81 is opened in opposite direction to the second frame portion 83, and the first frame portions 82 each include the mounting orifice 82c. In other words, the vibration isolator 90 is attached to each of the first frame portions 82. The second frame portion 83 includes the corrugated portion 83a formed by bending a part (generally central portion) of the second frame portion 83 in a wave shape. In this case, the corrugated portion 83a of the second frame portion 83 is more easily elastically deformable than the remaining portions of the frame 81. Therefore, upon applying a force to the pair of first frame portions 82 so as to move away from each other, the corrugated portion 83a of the second frame portion 83 is elastically deformed so that the clearance between the first frame portions 82 becomes wider, which facilitates the HDD 70 to be placed in the accommodation space S. After the HDD 70 is set in the accommodation space S, simply releasing the first frame portions 82 from the force thus far exerted thereon allows the corrugated portion 83a of the second frame portion 83 to restore the initial shape, thereby allowing the pair of first frame portion 82 to restore the initial clearance. Thus, the work efficiency for placing the HDD 70 in the accommodation space S can be improved.

Further, since the clearance between the first frame portions 82 can be made wider, the HDD 70 can be kept from contacting the vibration isolator 90 so as to unintentionally deform the vibration isolator 90, when the HDD 70 is placed in the accommodation space S. Therefore, degradation of the vibration isolating effect can be suppressed.

In this embodiment, still further, each of the projecting portions 93 includes the convex part 95 formed on the outer circumferential surface of the respective split portions, so as to protrude radially outward from the peripheral edge of the mounting orifice 82c when the projecting portions 93 are free from an external force, i.e., when the projecting portions 93 are fitted in the mounting orifice 82c. Accordingly, the convex parts 95 serve to restrict the vibration isolator 90 from moving in the axial direction because of the interference with the peripheral edge of the mounting orifice 82c, even when the smaller cylindrical portion 92 remains unspread because of the projecting portions 93 being free from an external force, i.e., the HDD 70 not being placed in the accommodation space S. Therefore, the vibration isolator 90 can be prevented from falling off on the opposite side of the accommodation space S. Here, the convex parts 95 are independently formed on the respective projecting portions 93, and not an annular projection continuously formed in the circumferential direction of the smaller cylindrical portion 92. Therefore, the smaller cylindrical portion 92 can be fitted in the mounting orifice 82c without the need to exert a large force on the vibration isolator 90, in other words without the need to largely deform the vibration isolator 90.

Still further, in this embodiment the larger cylindrical portion 91 and the smaller cylindrical portion 92 of the vibration isolator 90 are configured so as to allow the screws for fastening the HDD 70 to the frame 81 to be inserted. Therefore, upon inserting the screws in the larger cylindrical portion 91 and the smaller cylindrical portion 92 of the vibration isolator 90 and fastening the HDD 70 to the frame 81 with those screws allows the HDD 70 to be immovably fixed in the accommodation space S.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A retaining structure for an information recording device, the retaining structure comprising:
   a frame forming an accommodation space in which the information recording device to be retained is accommodated; and
   a vibration isolator mounted on the frame and abutting against the information recording device accommodated in the accommodation space,
   wherein the frame includes a through hole in a prescribed position,
   the vibration isolator includes a cylindrical portion formed so as to be fitted in the through hole,
   the cylindrical portion includes projecting portions formed by splitting one end portion of the cylindrical portion into a plurality of portions in a circumferential direction, the projecting portions project into the accommodation space, abut against the information recording device, and are pressed by the information recording device when the cylindrical portion is fitted in the through hole,
   each of the projecting portions includes a notch part recessed toward a center position of the cylindrical portion from an outer circumferential surface of the cylindrical portion and extending across each of the projecting portions in the circumferential direction of the cylindrical portion,
   the notch part is formed in a shape having a wedge-shaped cross section so as to become narrower toward a center position of the cylindrical portion from the outer circumferential surface of the cylindrical portion,
   the projecting portions are configured to be bendable so as to be spread radially outward from a peripheral edge of the through hole about the notch part serving as the fulcrum by being pressed by the information recording device,
   the frame includes a pair of first frame portions opposite to each other through the accommodation space, and a second frame portion connecting between one of end portions of the respective first frame portions and is opened in opposite direction to the second frame portion,
   the first frame portions each include the through hole, and
   a part of the second frame portion includes a corrugated portion bent so that portions protruding away from the accommodation space and portions protruding into the accommodation space repeatedly alternate.

2. The retaining structure according to claim 1, wherein the cylindrical portion is configured to allow a screw for fastening the information recording device to the frame to be inserted.

3. A retaining structure for an information recording device, the retaining structure comprising:
   a frame forming an accommodation space in which the information recording device to be retained is accommodated; and
   a vibration isolator mounted on the frame and abutting against the information recording device accommodated in the accommodation space,
   wherein the frame includes a through hole in a prescribed position,
   the vibration isolator includes a cylindrical portion formed so as to be fitted in the through hole,
   the cylindrical portion includes projecting portions formed by splitting one end portion of the cylindrical portion into a plurality of portions in a circumferential direction, the projecting portions project into the accommodation space, abut against the information recording device, and are pressed by the information recording device when the cylindrical portion is fitted in the through hole,
   each of the projecting portions includes a notch part recessed toward a center position of the cylindrical portion from an outer circumferential surface of the cylindrical portion and extending across each of the projecting portions in the circumferential direction of the cylindrical portion,
   the notch part is formed in a shape having a wedge-shaped cross section so as to become narrower toward a center position of the cylindrical portion from the outer circumferential surface of the cylindrical portion,
   the projecting portions are configured to be bendable so as to be spread radially outward from a peripheral edge of the through hole about the notch part serving as the fulcrum by being pressed by the information recording device,
   each of the projecting portions includes a plurality of semispherical convex parts formed on the outer circumferential surface so as to radially project outward from a peripheral edge of the through hole when the projecting portions are fitted in the through hole.

4. The retaining structure according to claim 3, wherein the convex part is located on the side of the distal end portion being abutted to the information recording device, of the projecting portions, with respect to the notch part.

5. An image forming apparatus comprising:
   an information recording device; and
   a retaining structure configured to retain the information recording device,
   wherein the retaining structure includes:
   a frame forming an accommodation space in which the information recording device to be retained is accommodated; and
   a vibration isolator mounted on the frame and abutting against the information recording device accommodated in the accommodation space,
   the frame includes a through hole in a prescribed position,
   the vibration isolator includes a cylindrical portion formed so as to be fitted in the through hole,
   the cylindrical portion includes projecting portions formed by splitting one end portion of the cylindrical portion into a plurality of portions in a circumferential direction, the projecting portions project into the accommodation space, abut against the information recording device, and are pressed by the information recording device when the cylindrical portion is fitted in the through hole,
   each of the projecting portions includes a notch part recessed toward a center position of the cylindrical portion from an outer circumferential surface of the cylindrical portion and extending across each of the projecting portions in the circumferential direction of the cylindrical portion,
   the notch part is formed in a shape having a wedge-shaped cross section so as to become narrower toward a center position of the cylindrical portion from the outer circumferential surface of the cylindrical portion, the projecting portions are configured to be bendable so as to be spread radially outward from a peripheral edge of the through hole about the notch part serving as the fulcrum by being pressed by the information recording device, the frame includes a pair of first frame portions opposite to each other through the accommodation space; and a second frame portion connecting between one of end portions of the respective first frame portions and is opened in opposite direction to the second frame portion, the first frame portions each include the through hole, and a part of the second frame portion includes a corrugated portion bent so that portions protruding away from the accommodation space and portions protruding into the accommodation space repeatedly alternate.

6. The image forming apparatus according to claim 5, wherein each of the projecting portions includes a plurality of semispherical convex parts formed on the outer circumferential surface so as to radially project outward from a peripheral edge of the through hole when the projecting portions are fitted in the through hole.

7. The image forming apparatus according to claim 6, wherein the convex part is located on the side of the distal end portion being abutted to the information recording device, of the projecting portions, with respect to the groove part.

8. The image forming apparatus according to claim 5, wherein the cylindrical portion is configured to allow a screw for fastening the information recording device to the frame to be inserted.

\* \* \* \* \*